Aug. 5, 1924.                                                    1,504,189
C. E. REES
LOCK NUT
Filed Feb. 3, 1923

Inventor
Charles E. Rees
Vernon E. Hodges
By                his Atty

Patented Aug. 5, 1924.

1,504,189

UNITED STATES PATENT OFFICE.

CHARLES E. REES, OF NEWTONVILLE, MASSACHUSETTS.

LOCK NUT.

Application filed February 3, 1923. Serial No. 616,782.

*To all whom it may concern:*

Be it known that I, CHARLES E. REES, a citizen of the United States, residing at Newtonville, in the county of Middlesex and State of Massachusetts, have invented certain new and useful Improvements in Lock Nuts, of which the following is a specification.

My invention relates to an improvement in lock nuts.

The object is to provide an effective means for locking nuts against accidental displacement, and in so doing to provide a simple, inexpensive device of such form and construction that it will include a minimum of parts with the least possible amount of play and vibration.

Another object is to provide a nut-lock in which the locking means is interchangeable and reversible to adapt it for either right or left-hand threads.

In the accompanying drawings:—

Figure 1:
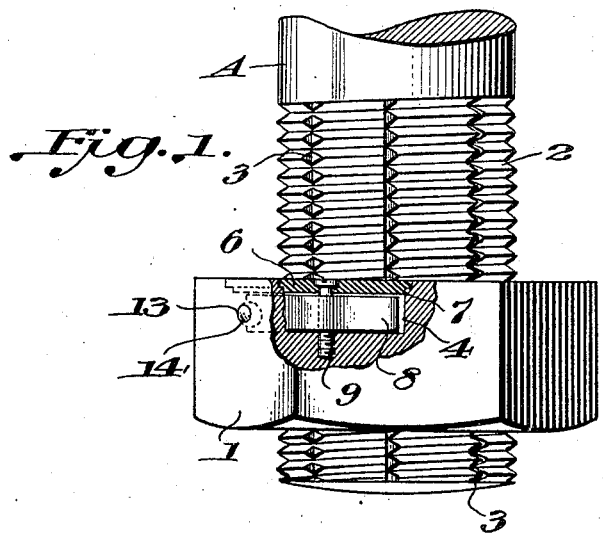
Fig. 1 is a fragmentary view with parts broken away.

A, represents a bolt, and 1 is a nut adapted to screw on the threads 2 of the bolt, and automatically be locked against turning in a reverse direction. Longitudinal grooves or notches 3 are cut part-way through the threads, longitudinally of the bolt, and as many of these are provided as desired, as their depth is such that they do not in any wise weaken the bolt or impair the threads. In cross-section, these are preferably in the form of a ratchet-tooth, that is to say in the form of an acute angle, with the left-hand edge abrupt, and the right-hand edge less abrupt in a right-hand thread, as shown in Figs. 1 and 2, and just the reverse where the threads are left-hand threads.

Figure 2:
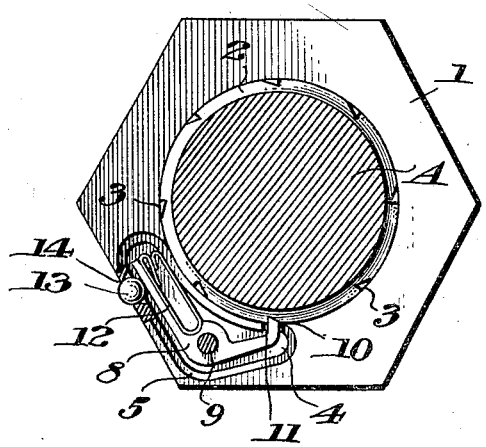
Fig. 2 is a section through the bolt looking from the inside toward the nut with the cover-plate removed.
Figure 3:
Fig. 3 is a view in perspective of the cover-plate.

A recess 4 is cored out of the inner space of the nut 1, as shown in Fig. 2, of suitable depth, with chamfered edges 5; and the cover plate 6 is of corresponding form with the chamfered edges 7 precisely to fit the edges 5 of the recess 4, whereby to close the recess and prevent vibration and rattling, and to exclude dust or other extraneous matter.

The recess and cover-plate preferably take the general form of the letter L, and the location is, by preference, at an angle of the nut as viewed in Fig. 2.

Within the recess and more or less corresponding in shape is the dog 8. This is held pivotally in place by a screw 9, which may conveniently serve the double purpose of affording a pivotal support or fulcrum for the dog or pawl 8, and also to secure the cover-plate 6 in place; and as the plate 6 and the head of the screw are flush with the inner face of the nut, when the latter is screwed home, the plate and head of the screw are covered, concealed, and fully protected.

The tooth 10 at the end of the dog or pawl protrudes through an opening 11 in the threaded bore of the nut, and is shaped to conform with the transverse shape of the grooves or notches 3 into which it drops and locks automatically when the nut is turned, thereby preventing the nut from being reversed, or from accidentally working loose when once tight, and the tooth of the dog or pawl has reached a groove.

A U-shaped spring 12 has its inner end secured in the dog or pawl, and its free ends bear against the wall of the recess 4, and one end of the dog or pawl, the shape of the spring being intended to prevent vibration and working loose. For this reason, it approximately fits the confines that it is fashioned to occupy, as clearly shown in Fig. 2.

A ball or plunger 13 is held in a hole 14 in the surface of the nut, where its outward movement is limited by the diameter of the hole 14 being less than the major diameter of the ball as is illustrated in Fig. 2. This ball or plunger is in position to be pressed inwardly by the wrench when applied to the nut, or by the operator's finger to lock the pawl or dog 8 on its pivot 9, whereby to remove the tooth 10 from the groove or notch 3 in which it is resting when the nut is locked.

In this simple manner, the lock is released, and the nut may be turned as freely in one direction as the other. Immediately upon being released, or the pressure being removed from the ball or plunger 13, the spring 12 expands and holds the toothed end of the dog or pawl 8 in contact with the threads of the bolt, ready to drop in the first groove or notch 3 as the nut is turned to lock the latter against being turned or turning and working loose in the reverse direction.

From the foregoing, it will be seen that a simple form of nut-lock is provided with the operative parts housed and protected and prevented from vibration, and the wear and noise attendant thereupon. At the same time, the lock is of simple structure, easy and inexpensive to manufacture, and the parts are easily assembled, and broken parts can be easily replaced.

The nut-lock is equally applicable to either a right or left-thread, and the dog or pawl is always the same, that is to say reversible and interchangeable. In a left-hand nut, the recess 4 would be disposed in the opposite direction, and the dog or pawl would be similarly placed, and the cover-plate would correspond. Obviously, with a left-hand thread, the threads of the nuts would have to be of the same character; and the left-hand nut would have the recess formed in the required position to operate on left-hand threads and the left-hand grooves or notches.

Other slight changes might be made in the form and arrangement of the several parts without departure from the spirit of the invention.

I claim:

A nut-lock including a threaded bolt having a plurality of longitudinally disposed ratchet grooves or notches extending across the threads, a nut having a substantially L-shaped recess formed in the inner face at one of its angles, a dog or pawl located within the recess, a spring for holding the dog or pawl in its normal position, movable means protruding beyond the outer surface of the nut, and in position to be pressed inwardly against the dog or pawl and against the action of the spring when it is desired to unlock the nut, a cover-plate corresponding in shape with the recess and adapted to close same, and a screw serving to hold the cover-plate in position and as the pivot of the dog or pawl.

In testimony whereof I affix my signature:

CHARLES E. REES.